(12) United States Patent
Lafaye de Micheaux

(10) Patent No.: US 6,804,563 B1
(45) Date of Patent: Oct. 12, 2004

(54) MULTIDIMENSIONAL METHOD AND SYSTEM FOR STATISTICAL PROCESS CONTROL

(76) Inventor: Daniel Lafaye de Micheaux, 221 Chemin du Mas de Carrière, Aubais (FR), 30250

( * ) Notice: Subject to any disclaimer, the term of this patent is extended or adjusted under 35 U.S.C. 154(b) by 0 days.

(21) Appl. No.: 09/787,685

(22) PCT Filed: Sep. 22, 1999

(86) PCT No.: PCT/FR99/02254
§ 371 (c)(1),
(2), (4) Date: Mar. 21, 2001

(87) PCT Pub. No.: WO00/17790
PCT Pub. Date: Mar. 30, 2000

(30) Foreign Application Priority Data

Sep. 22, 1998 (FR) .......................................... 98 12113

(51) Int. Cl.[7] .......................... G06F 19/00; G05B 15/00
(52) U.S. Cl. .......................... 700/51; 700/108; 700/109; 700/121; 702/179
(58) Field of Search .......................... 700/51, 108, 109, 700/121; 702/179, 183, 184, 187

(56) References Cited

U.S. PATENT DOCUMENTS

| | | | | |
|---|---|---|---|---|
| 5,023,045 A | * | 6/1991 | Watanabe et al. ........... | 376/215 |
| 5,150,289 A | * | 9/1992 | Badavas ....................... | 700/34 |
| 6,424,876 B1 | * | 7/2002 | Cusson et al. .............. | 700/108 |
| 6,442,445 B1 | * | 8/2002 | Bunkofske et al. .......... | 700/108 |
| 6,539,267 B1 | * | 3/2003 | Eryurek et al. ................ | 700/51 |
| 6,584,368 B2 | * | 6/2003 | Bunkofske et al. ........... | 700/83 |
| 6,678,569 B2 | * | 1/2004 | Bunkofske et al. .......... | 700/108 |

FOREIGN PATENT DOCUMENTS

| | | | | |
|---|---|---|---|---|
| EP | 0 660 211 | 12/1994 | ........... | G05B/21/02 |

OTHER PUBLICATIONS

Kourti et al., "Process analysis, monitoring and diagnosis, using multivariate projection methods" Chemometrics and Intelligent Laboratory Systems, vol. 28, pp. 4–21 Apr. 1995.

Milanese et al., "Correspondence Analysis and Hierarchical Indexing For Content–Based Image Retrieval", International Conference on Image Processing, vol. 3, pp. 860–863, Sep. 1996.

Zhang et al., "Fault Detection and Classification through Multivariate Statistical Techniques", Proceeding of the 1995 American Control Conference, vol. 1, pp. 751–755, 1995.

Runger et al., "Multivariate and Univariate Process Control: Geometry and Shift Directions" Quality and Reliability Engineering International, vol. 13, 153–158, 1997.

J. Cuellar, "Statistical Process Control for Nonnormally Distributed Variables Through the Use of Transformations" IEEE/SEMI Advanced Semiconductor Manufacturing Conference and Workshop, pp 143–148, 1991.

\* cited by examiner

*Primary Examiner*—Emanuel Todd Voeltz
(74) *Attorney, Agent, or Firm*—Cohen, Pontani, Lieberman & Pavane

(57) ABSTRACT

The present invention relates to a method and to any system using such a method for performing statistical process control on the basis of taking indicators or measurements on the inputs, the outputs, and the control and operating parameters of said process, and which can be represented by observation points in frames of reference associating their values to their sampling indices. In the invention, the observed values are transformed so that the resulting values are compatible with the multidimensional Gaussian distribution model; said transformed observation points are situated in a multidimensional space, each dimension being associated with a measured magnitude; the out-of-control observation points situated in this way and concentrated in a particular direction are identified; and said direction is associated with a common cause for drift in said process, and each observation-and-anomaly pair is associated with indicators in order to propose zero, one, or more causes of anomaly that might relate to the observation made.

8 Claims, 5 Drawing Sheets

Probability threshold = prob (ICOS ideal I>I cos observe)

MULTIDIMENSIONAL METHOD AND SYSTEM FOR STATISTICAL PROCESS CONTROL

This is a U.S. national stage of application No. PCT/FR99/02254, filed on Sep. 22, 1999. Priority is claimed on that application and on the following application Country: France, application No.: 98/12113, filed on Sep. 22, 1998.

The present invention relates to a method and any system using such a method of statistical process control based on multidimensional processing of data.

Its purpose is firstly to trigger a warning when the process departs from "normal" operation which ensures that its production is of the required quality, and secondly to make proposals for identifying the probable cause(s) of the anomaly.

Statistical process control (SPC) is presently in use in a very large number of businesses, in all countries (mainly industrialized countries), for all types of industrial production: engineering, electronics, chemistry, pharmaceuticals, agri-food, plastics materials, . . . .

Its purpose is to ensure product quality by inspecting the manufacturing process itself and not only by inspecting the characteristics of its products. SPC has become essential in achieving "zero defects" and when the business seeks to comply with international quality assurance standards (ISO 9000).

Its technical objective is to detect possible drift in the manufacturing process and to remedy it before non-compliant products are manufactured.

The use of this method has now extended beyond the context of manufacturing goods and covers producing services (banking, insurance, consultancy, . . . ).

When running a process (cf. FIG. 1), various measurements (indicators) associated with the same process are tracked: input characteristics (raw materials); output characteristics (products); process operating parameters. Each unit of observation (measurement instant or element produced) is thus associated with a plurality of digital values obtained by the measurements, thus enabling it to be represented by a point in the multidimensional space of the measurements taken.

The usual practice in SPC consists in monitoring the process by tracking a plurality of control charts which are graphical representations of the way an observed magnitude varies and which present predefined control limits (see FIG. 2), one per measurement. Each control chart is then interpreted independently of the others, triggering warnings independently.

Various types of control chart are available (known as "Shewart, CuSum, EWMA, MME"), with the last three being accepted as being better at detecting small amounts of "drift" than the first.

Generally, control charts are used on grouped data: by plotting the averages of a plurality of grouped-together measurements, small amounts of drift are detected better, and in addition the distribution of the values coincides better with the assumption of normality that underlies the method. By plotting the variances or the extents of each group, it is possible to detect an increase in measurement variability that has some special cause.

The usual practice which consists in simultaneously and independently monitoring a plurality of control charts constitutes a method that is clumsy and not very effective in multidimensional SPC:

it raises too many false warnings which can give rise to unnecessary corrections; these then need to be reassessed very quickly, and lead to the process being controlled in a manner that is chaotic and expensive, with multiple corrections;

it can detect real anomalies too late; and it has difficulty in detecting the causes of anomalies when they are not directly associated with a measurement. This encourages taking a multiplicity of measurements which is expensive and leads to a multiplicity of control charts.

The method and system of the present invention seek to mitigate those drawbacks: the method is one of statistical process control on the basis of taking indicators or measurements on inputs, on outputs, and on control and operating parameters of said process, and which can be represented by observation points in frames of reference that associate their values with their sampling indices; according to the invention:

a) the observed values are transformed so that the resulting values are compatible with the multidimensional Gaussian distribution model, and constitute data corresponding to the observation points used in the remainder of the method;

b) said observation points are situated in a multidimensional space, in which each dimension is associated with a measured magnitude;

c) amongst the observation points, points that are said to be "under control" and that correspond to proper operation of the process are distinguished from points which are said to be "out of control";

d) the distribution center of the points under control is calculated as being the center of gravity of the observation points under control;

e) out of control observation points that are concentrated in some particular direction from the distribution center of the points under control are identified;

f) this direction is associated with a common cause for drift of said process;

g) each observation point and anomaly direction pair is associated with indicators in order to propose zero, one, or more causes of anomaly that are liable to be associated with the observation that has been made; and h) when an anomaly is analyzed in this way, a warning is triggered and the drift detected in this way in the industrial process is remedied.

Said center of gravity of the observation points being inspected corresponds to a point whose components are the means of the components of the observation points under inspection.

SPC inspection consists in conventional manner in regularly observing p continuous magnitudes $y^1, y^2, \ldots, y^p$ either statistically or by sampling. These magnitudes can equally well represent characteristics of raw materials, characteristics of manufactured products, or operating parameters of the manufacturing process. The p-dimensional vector made up of these p measurements at a given "instant" is written y and is referred to as the observation vector of the process, with the endpoint of this vector being the observation point of the process and the origin of this vector being the original of the frame of reference in question.

It is clear that in this context the concept of "instant" goes beyond a strictly temporal interpretation: measurements associated with the same "instant" are, wherever possible, measurement of parameters relating to the production of the same manufactured unit or batch. Perfect traceability of the manufacturing process is then necessary in order to be able to define which measurements are associated with the same "instant".

When the process is "under control", the values of y at various successive instants $t_0$, $t_0+1$, $t_0+2$, . . . vary "little" about a value y0, which is the desired target for ensuring that production is of satisfactory quality. This variation is due to random variations in the characteristics of the raw materials (material hardness, chemical composition of a component, supplier, . . . ), of the environment (temperature, humidity, . . . ), or of the process (setting of a machine, attention of an operator, . . . ). These characteristics have influence over one or more components of y and they are written $z^1$, $z_2$, . . . , $z^m$ and together they form a vector written z. The vector z is referred to herein as the explanatory vector of the process.

For a characteristic of the process to be considered as an "observation variable" of the process $y^j$ it must be evaluated at each "instant".

For a characteristic of the process or of the inputs to be considered as a "cause variable" $z^k$ of the process, it must be modified by an agent external to the system proper: voluntary or involuntary human action, variation in the environment, wear, or aging. Generally, for reasons of expense or of feasibility, these variables are not measured at each "instant" (otherwise they would also appear as variable $y^j$) and in this sense they constitute "hidden variables" that influence the behavior of the process. Evaluating them is often expensive, lengthy, imprecise, and is performed only in the event of an anomaly.

A variable can be quantitative if its possible values are numerical and belong to a known range of values (temperature, pressure, . . . ), or it can be qualitative when the possible values, numerical or otherwise, are limited in number (supplier, operator, machine, . . . ). The models and methods considered in the present invention assume that the components of y are all quantitative.

The same characteristic of the process (e.g. the controlled temperature of a furnace) can appear both as a component of z as a component of y.

The dependency between y and z can be modelled by the following relationship:

$$y = f(z,t) + \epsilon$$

where t designates the observation instant and $\epsilon$ is a random vector of dimension p whose average is assumed to be zero and which has a covariance matrix $\Sigma_\epsilon$. f is a vector function having p components $f^1$, $f^2$, . . . , $f^p$ such that $y_i = f^i(z,t) + \epsilon$.

The components of y are correlated with one another as are the components of z.

A perfectly stabilized process under steady conditions ought to present the following aspects:

f(z,t) does not in fact depend on t;
each "cause variable" $z^k$ is stabilized on a fixed value $z_0^k$; and y can be modelled by a steady process of the form:

$$y = f(z_0) + \epsilon$$

In reality, it is not possible to determine perfectly the quantitative cause variables: the variable $z_0$ has added thereto a random error of zero expectation and of covariance matrix $\Sigma_e$. The model then becomes:

$$z^k = z_0^k + e^k$$

$$y = f(z_0 + e) + \epsilon$$

The method proposed by the invention lies in the following context which is the usual context for SPC:

the function f is unknown;

the explanatory variables $z^k$ are not all identified; and n observations have been made of the variables $y^1$, . . . , $y^p$ at the "instants t=1, . . . , t=n.

These observations are written in the form of a matrix Y having n rows and p columns. $y^j$ designates the jth column of Y; the ith element of this column is written $y_i^j$ and designates the observation made at instant t=i of the variable $y^j$. The vector of observations of the variables $y^1$, . . . , $y^p$ at the "instant" t=i is written $y_i$.

The observation $y_i$ is given a weight $p_i$, which is generally equal to 1/n. The diagonal matrix (n, n) having the weights $p_i$ as diagonal terms is written $D_p$.

when the process is properly under control:
it is properly centered on the target value y0.
y0 is then equal to the mathematical expectation E[y] of y; y0 is thus very close to the observed mean value $m_y$ (where $m_y$ designates the vector constituted by the means $\bar{y}^1$, . . . , $\bar{y}^p$ of the p columns $y^1$, . . . , $y^p$ of the matrix Y).
its variability is constant and comparable with the specification limits defined on the various variables $y^j$,
the covariance matrix of the random vector y does not vary in time.
when the process is drifting, the observed values $y_i$ move too far away from the target value y0. Such behavior can be the result of:
variation over time in the center value of one or more cause variables $z^k$; or
an increase in time in the variance of one or more randoms $\epsilon^k$ or $e^j$.
If the drift is qualitative concerning the cause variable $z^k$, causing this variable to go from a value $z0^k$ to a value $z1^k$, then the center of the distribution is moved from y0 to y1. The observed points are then moved in the direction y1−y0.

If the drift is quantitative concerning $z^k$ and the process is not unstable around y0 relative to $z^k$, then it can be assumed that each function $f^j$ has a partial derivative $f^{jk}$ relative to $z^k$. The calculus of variations then shows that to the first order:

drift in the mean, $z1^k = z0^k + d$ implies that the center of the observed points moves from y0 in the direction defined by the vector of the partial derivatives ($f^{1k}(y0)$, . . . , $f^{jk}(y0)$, . . . , $f^{pk}(y0)$);

an increase in the variability of the random $e^k$ will give rise to the distribution of the observed points $y_i$ being "stretched" in the same direction:

$$(f^{1k}(y0), \ldots, f^{jk}(y0), \ldots, f^{pk}(y0))$$

an increase in the variability of the random $e^j$ gives rise to the distribution of the observed point $y_i$ being "stretched" in the direction of the jth basic vector $$(0, \ldots, 0, 1, 0, \ldots, 0)$$
$$\phantom{(0, \ldots, 0,} 1 \phantom{,} j \phantom{,} p$$

The method of the present invention seeks and manages to achieve the following technical objectives:

during a historical analysis stage:
identifying the directions associated with any drift that has been identified in the historical record and define parameters making it possible for each observation to calculate proximity indicators for these directions;

during an operational stage of controlling the process:
detecting whether the latest observation reveals any drift in the operation of the process and then, by examining the proximity indicators, identifying the identified cause direction that appears closest to the observed point, thus proposing a probable cause or causes for the drift;

proposing in both stages graphical representations that enable the situation to be evaluated quickly and as a whole.

In order to adapt the system to the particular features of each process, several versions are proposed for each kind of processing performed in the system.

The present invention provides a method of statistical process control and any system using such a method based on measured indicators or measurements of inputs, outputs, and control and operating parameters of said process and comprising various kinds of processing on the values obtained in this way: it preferably operates by means of a computer performing computer processing, and in the processing step operating entirely automatically or while assisting the user.

Its operation takes place in two stages:

A learning stage including performing historical analysis of the process; the history is made up of a set of magnitudes associated with the operation of the process; these magnitudes are measured or evaluated at successive instants or on parts taken by sampling.

The purpose of this analysis is:

to identify the instants at which drift in the process becomes manifest; and the special cause(s) of the observed drift (by exchanging information with a specialist user of the real process under study).

to evaluate the values of the parameters which define the directions associated with each identified special cause.

A process-tracking stage.

During this stage, the system receives measurements and data from the process (from sensors over direct links, or via manual input). It then enables warnings to be triggered when the process drifts. The magnitudes associated with each cause are evaluated for this observation, so it also specifies the probable cause(s) of the drift, which causes are selected from those that have previously been identified by the analysis of the method. If no cause is proposed, then the cause is identified by causing a human to examine the real process; the newly identified cause is then integrated in the system so as to enable it to be identified automatically should it occur again at a later date.

The pertinence and the originality of the system of the present invention come from:

the appropriateness of the model proposed and the extent of its applications;

the properties of the trace of an anomaly in the multidimensional space of the observed magnitudes: a straight line in the observation space $R^n$;

the definition of composite magnitudes that are characteristic of each identified cause and the associated probability laws: "cause intensity" and "angular proximity";

the powerful multidimensional statistical analysis methods adapted to this model that are used: classification of out-of-control points, determining cause directions;

the pertinence of the proposed graphical representations: control charts graduated with probability thresholds; and by analyzing the history of the process, the learning stage contributes to identifying anomalies using the following steps:

A1—Prior transformation of the data;

A2—Distinguishing between under-control measurements and out-of-control measurements;

A3—Identifying types of special causes and associated direction parameters;

A4—Creating and examining control charts on the special cause indicators; and

A5—Interpreting the special causes.

These steps are implemented interactively with specialists in the real process who can intervene to introduce new information into the system (observations recognized as being out of control, associating a plurality of causes, identifying measurements that are suspect, . . . ) and to take advantage of partial information provided by the system in order to refine interpretation thereof in the history. Results obtained in one step often make it possible to repeat one or more earlier steps with modifications to options or certain parameters.

The history of a process is characterized by the matrix Y having n rows and p columns. The element $y_i^j$ situated at the intersection of row i and column j represents the value taken by the variable $y^j$ during the observation at "instant" i.

Step A1: Prior Transformation of Data

Figure 1:
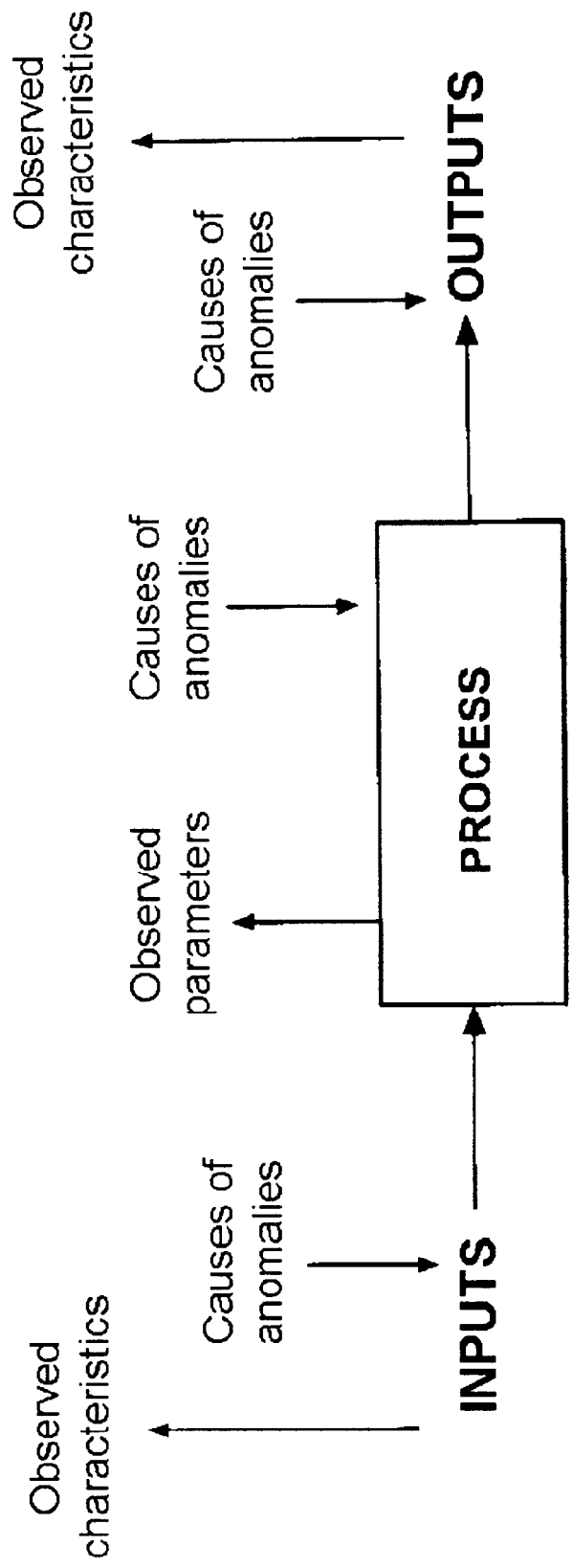
FIG. 1 is a general depiction of a process of the type capable of being controlled by the present invention.
Figure 2A:
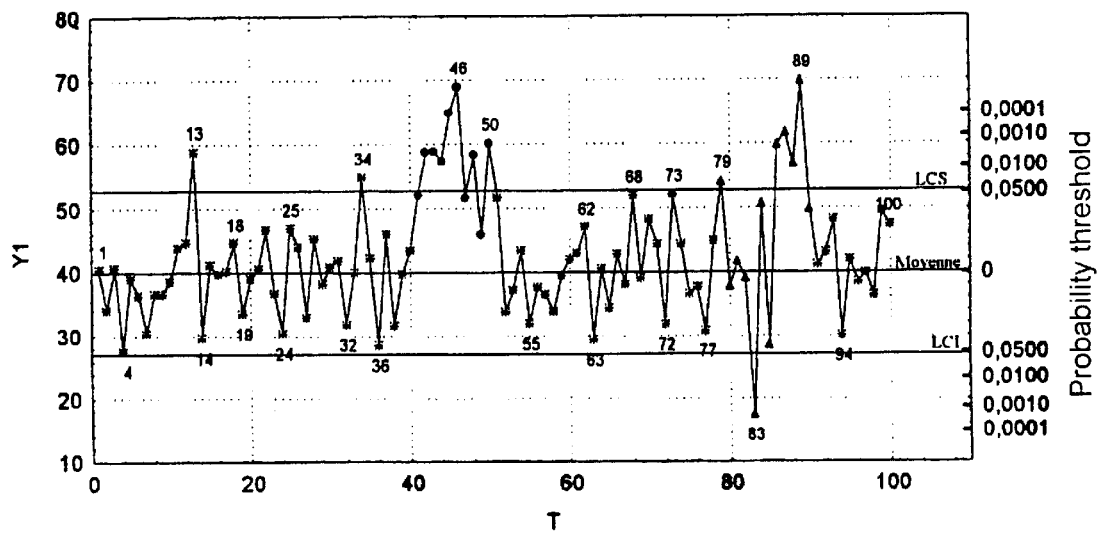
FIGS. 2A and 2B graphically depict data control charts for two monitored parameters of a controlled process.
Figure 2B:
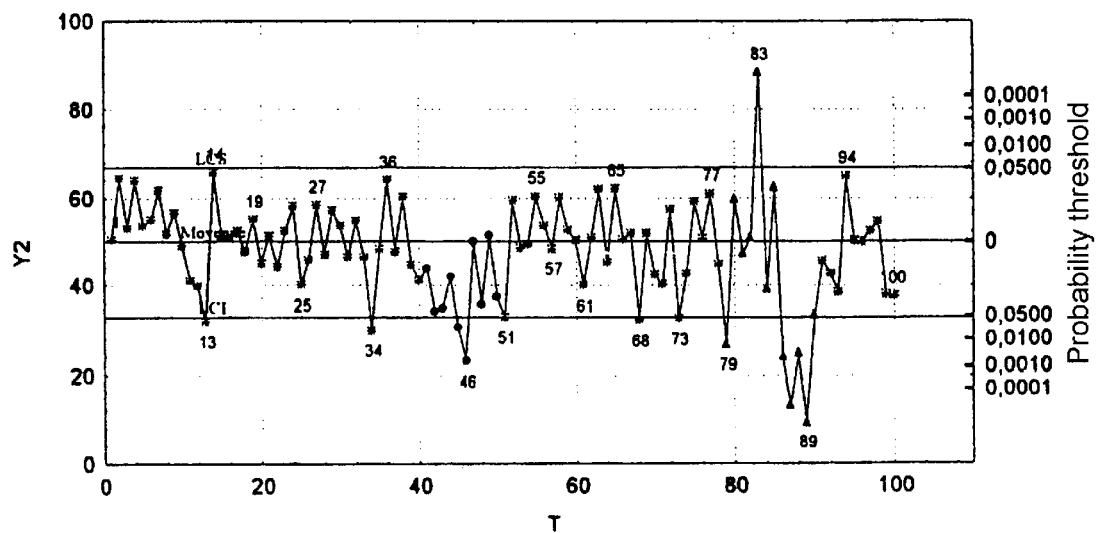

This relates to transforming observed raw data $y_i^j$ so that the values on which the processing is applied are closer to the model underlying the method as described above, thereby increasing the pertinence of the results.

The transformations that are most generally useful are performed separately on each observed variable, transforming the raw value of an observation $y_i^j$ into a new value $\tilde{y}_i^j$. The following transformations can be mentioned, but they are not exclusive:

Successive readings can be grouped together to form a single averaged reading. (Cf. control charts for grouped data.) For example:

$$\tilde{y}_h^j = \frac{1}{w}\sum_{s=1}^{w} y_{(h-1)+w-s}^j$$

where w is the size of each group.

The differences between successive measurements in order to decorrelate measurements:

$$\tilde{y}_i^j = y_i^j - y_{i+1}^j$$

transformations giving a distribution that is "closer" to Gaussian distribution. For example:

$$\tilde{y}_i^j + F_G^{-1}(F_{y^j}(y_i^j))$$

where $F_G^{-1}$ is the function that is the inverse of the Gaussian distribution function, $F_{y^j}$ is the function assumed for the distribution of the variable $y^j$.

centering on presumed centers of the random variations; in which case:

$$\tilde{y}_i^j = y_i^j - c_i^j$$

Where the choice of the center value $c_i^j$ depends on concrete situations, knowledge about the process. Thus, this can be:

$c_i^j$=the average of under control values of the variable $y^j$;

$c_i^j$=the target $y0^j$ of the variable $y^j$, which is constant over time; or $c_i^j$=the target $y0_i^j$ of the variable $y^j$ which is time variable (small series, known and acceptable variations, . . . ).

scale transformations so as to make the scales of unrelated magnitudes more uniform or so as to take account of the importance given a priori to the variability in the observed measurements:

$$\tilde{y}_i^j = y_i^j / s_i^j$$

where $s_i^j$ designates the unit selected for this measurement, for example:

$s_i^j$=the standard deviation $y^j$ for under-control observations.

Step A2: Distinguishing Under-control Measurements and Out-of-control Measurements This consists in taking the measurements of the history and distinguishing between those which do not correspond to normal operation of the process while it is under control.

Initially, any observations which are recognized as being not under control by the people in charge of the process are labeled as being out of control.

Then, on observations that might still be considered as being under control, a Hotelling $T^2$ chart is constructed (see the work by Douglas C. Montgomery entitled "Introduction to statistical quality control", second edition, published by Wiley in 1991). Observations situated beyond the upper control limit associated with the threshold $\alpha$ are declared to be out of control. $\alpha$ designates the acceptability probability of false warnings. In general, the value selected for $\alpha$ is 0.05 or 0.001.

This step needs repeating: on each iteration, new observations are labeled as being out of control.

Iteration is stopped when the number of observations that lie outside the control limits of the $T^2$ chart is compatible with the acceptable probability $\alpha$ of false warnings.

This compatibility is evaluated by a conventional hypothesis test: given the observed frequency of out-of-limit values, the hypothesis is tested of having an out-of-limit measurement probability that is less than or equal to $\alpha$ (see the work by G. Saporta, "Probabilité, analyse des données et statistique" [Probability, data analysis, and statistics], published by Technip, 1990).

A3—Identifying the Special Cause Types and the Associated Direction Parameters For each observation in the history labeled as being out of control in the preceding step, the idea is to associate a well-identified cause for the anomaly, referred to as its "special cause".

This identification must be performed by using the knowledge of the people in charge of the process. Nevertheless, a well adapted automatic classification method applied to points that are recognized as being out of control can guide those people: such classification brings together observations which are capable of corresponding to a common cause of an anomaly, i.e. it brings together observation points that are close to a common direction in the multidimensional space.

A method that is suitable for this purpose is the automatic classification method of the hierarchical rising classification type using the absolute value of the cosine as a similarity index between two observation vectors and accepting the maximum binding criterion, also known as the diameter criterion, for making up groups (see the above-cited work by G. Saporta). Classification then applies to the out-of-control measurements which are centered on the distribution center of the out-of-control data.

An anomaly direction is more easily interpreted if the measurements most concerned with the anomaly are determined.

To do this, linear regression is performed without a constant term of the "step by step" or "best subset" type, taking the direction of the anomaly as the variable to be explained and the measured variables, after transformation and centering on the under-control distribution center as the explanatory variables.

On examining the variables selected in this way and the signs of the resulting regression coefficients, the people in charge of the process will be guided in determining the original of the anomaly.

A4—Creating and Examining Control Charts on the Indicators of Special Causes At the end of the preceding step, several groups of out-of-control observations are available, each group being associated with a particular anomaly or "special cause".

This step begins by associating each special cause with its principal direction whose existence is mentioned above, and then with two indicator functions. The two indicators are functions which, when applied to any observation, indicate whether the observation is capable of coming from abnormal operation of the process having this particular special cause.

Figure 3:
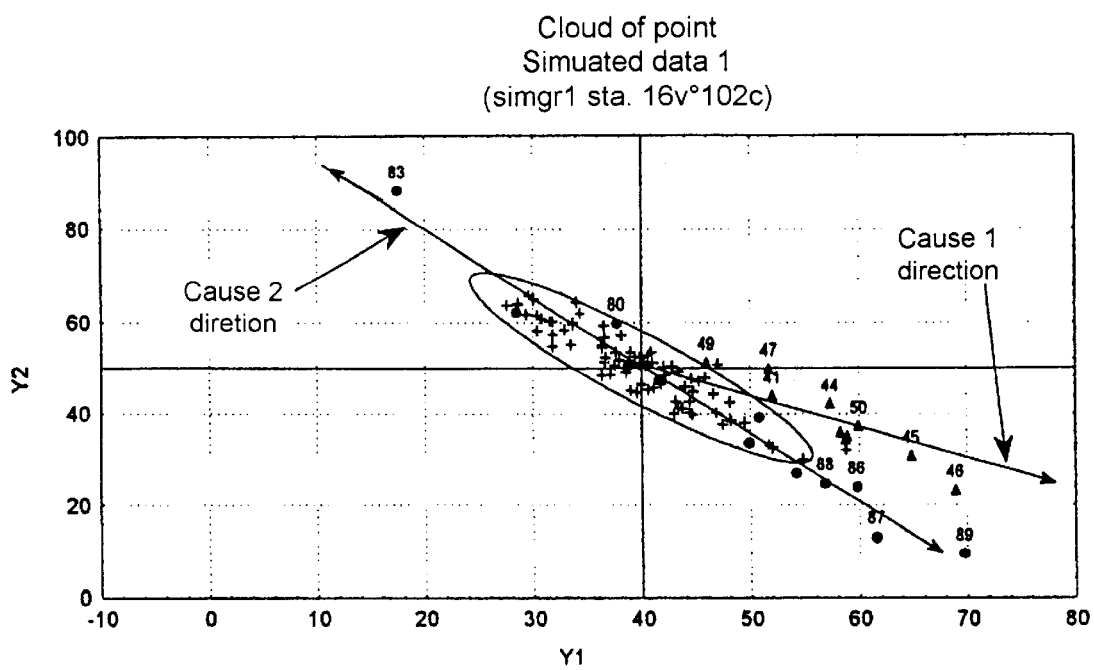
FIG. 3 illustrates an anomaly situation in data observation space using raw data values.
Figure 4:
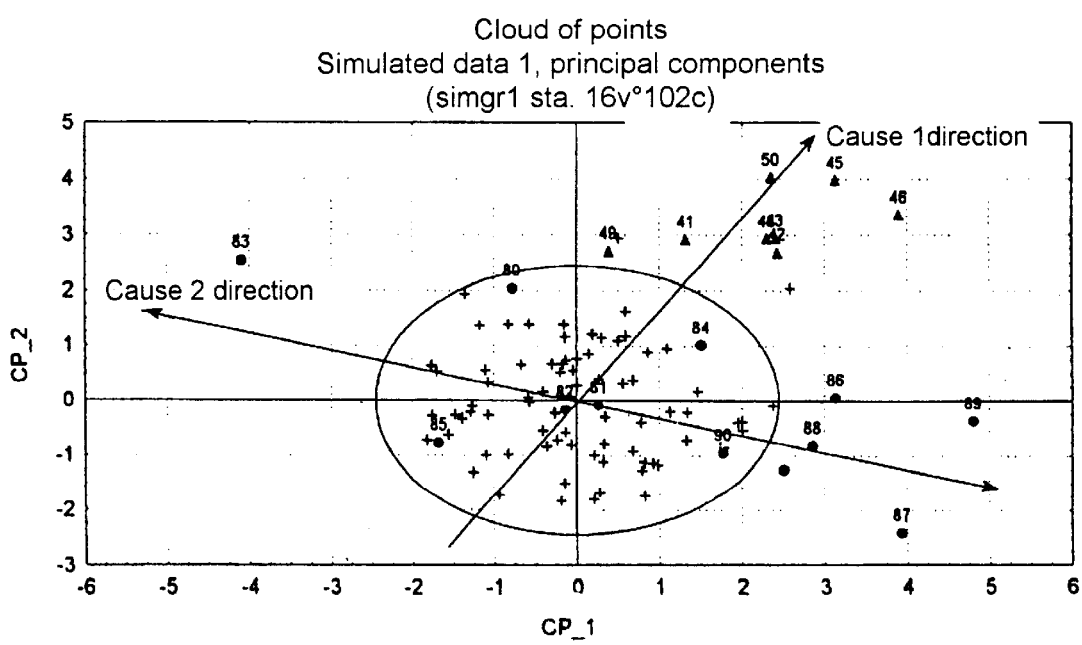
FIG. 4 illustrates an anomaly situation based on normalized principal components of controlled data.

FIGS. 3 and 4 illustrate as dimension 2 the directions associated with two different anomalies, FIG. 3 shows the situation in data observation space using raw values, while FIG. 4 shows the situation in the frame of reference based on normalized principal components of under-control data. It can be seen that the separation between the two types of anomaly is more marked in FIG. 4 than in FIG. 3.

The observation points that are then taken into consideration are to be found in the frame of reference based on the normalized principal components of measurements under control, so its origin coincides with the center of distribution of the under-control data.

The theoretical model described above leads to searching for the direction representative of an anomaly as extending from the center of distribution of under-control observations and "close" to the set of observation points that are due to the anomaly. This direction can be defined as the first inertial axis of the observation points associated with said anomaly, said axis passing through the origin (cf. the transformation mentioned above). It is known that such an axis is the first principal axis determined by principal component analysis that is not centered and not reduced to the cloud of observation points associated with the anomaly (see the above-cited work by G. Saporta).

After evaluating the direction in which the points associated with a special cause go away from the distribution center of the under-control points, it is possible to define two indicators associated with the anomaly:

the first indicator measures the distance to an observation point in said direction; and the second indicator measures the proximity of a point to said particular direction in the observation space $R^n$, in terms of angular proximity seen from the distribution center of the points that are out of control.

In the multidimensional observation space, the first indicator measures the distance of the observation along the direction associated with the special cause. It associates each observation-and-anomaly pair with an indicator of the intensity of the relationship between the observation and the anomaly, referred to as the "cause variable", obtained as the component of the observation point along the direction associated with the cause, with this indicator being calculated as a scalar product of the observation vector with the direction vector for the direction of the cause.

By calculating this scalar product in the normalized principal component space, that amounts to taking the matrix $V^{-1}$ in the initial measurement space as the scalar product matrix, where $V^{-1}$ designates the inverse of the covariance matrix V of the data under control when V is of full rank, and $V^{-1}$ designating the pseudo-inverse matrix of V if V is not of full rank.

This indicator is thus a linear combination of initial measurements, and on the assumption that these measurements obey a Gaussian law (when the process is under control), this indicator also obeys a Gaussian law; its variation can thus be followed using a conventional control chart. Thus, an observation situated out of control on such an intensity chart is highly likely to correspond to the type of anomaly that is represented by the indicator marked on the chart.

However, when an observation point is very far from the distribution center of points under control, it can appear to be far away in several cause directions and thus to be associated with several types of anomaly. To lift the ambiguity, the second indicator is then considered.

This is an angular proximity indicator between the direction representing the anomaly and the vector whose origin is at the center of the data under control and whose end is at the observation point. This angle can be evaluated as its cosine since that is easy to calculate: the cosine is calculated by dividing the above intensity indicator by the norm of the vector representing the observation.

Since this calculation is performed in normed principal component space, it is more pertinent and it can be used to define control limits that can be marked on the control chart relating to this new indicator.

When operation is under control, this indicator has a probability distribution whose distribution function F can be determined.

The function F is used to define the control limit $L\alpha$ of the angular proximity indicator beyond which an observation is allocated to said anomaly, said function F representing a distribution function of the cosine of the angle (x) formed by an arbitrary given direction in $R^n$, where $n \geq 2$, and a centered Gaussian random vector $R^n$ having the identity matrix as its covariance matrix, said distribution function F of said random variable being given by the following formula:

if $x < -1$     $F(x) = 0$ if $x > 1$     $F(x) = 1$ if $x \geq -1$ and $\leq 1$     $F(x) = 1 - \dfrac{S(\text{ArcCos}(x))}{S(\pi)}$ where $$S(\theta) = \int_0^\theta \sin^{n-2}(t)\,dt$$

such that $L\alpha = F^{-1}(\alpha)$, where $\alpha$ represents the acceptable probability for a false warning, $\alpha$ preferably representing a value lying in the range 0.001% to 0.05%. The term "false warning" is used herein to mean an observation that is under control being erroneously allocated to said anomaly.

By examining the angular proximity control chart it is possible to select from the points declared to be out of control by the "intensity" chart those points which genuinely depend from the anomaly under consideration: these points are declared to be out of control simultaneously on both charts.

In practice, such an angular proximity chart is not very readable since with a small number of dimensions the control limits are very close to 1 or −1. That is why it is preferred to use charts representing these indicators after appropriate transformation has been performed and on a chart expressed in probability thresholds and having a scale that is logarithmic.

This mode of representation can be useful for all types of magnitude to be inspected; it is easier to interpret and provides greater uniformity in presentation for charts associated with different probability distributions. Two types of chart are defined:

the unilateral chart $P_u$ which can be used when control applies to a single limit (as in the case of the $T^2$ chart); and the bilateral chart $P_b$ which is used when the control relates to a lower limit and an upper limit.

An observation value x associated with the index i of a distribution function $F_x$ is marked on a unilateral chart $P_u$. The observation is then plotted on the chart at abscissa i and ordinate $y = \min(\log_{10}(1 - F_x(x)), 4)$.

Figure 5A:
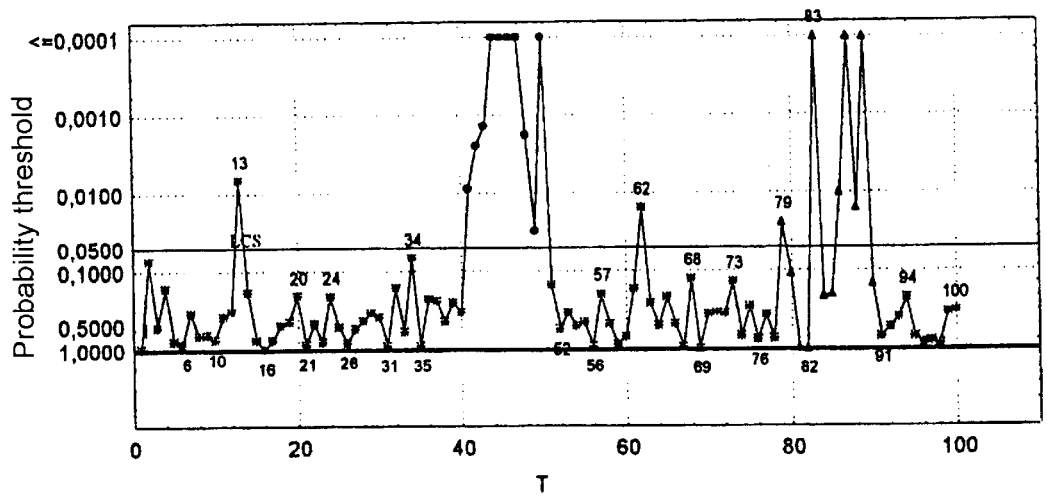
FIG. 5 graphically depicts a $T^2$ control chart with a corresponding $P_u$ chart.
Figure 5B:
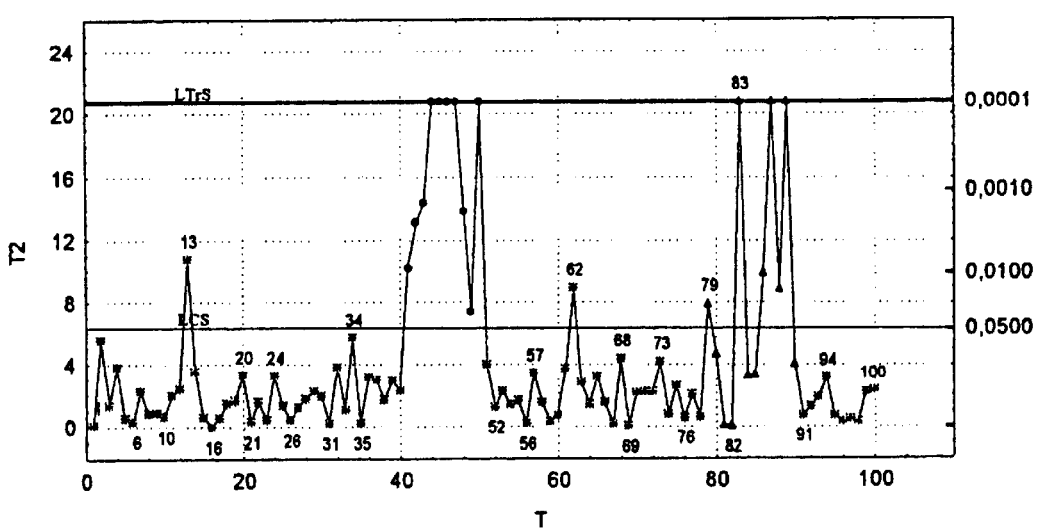

The ordinate scale is graduated by threshold values associated with integral values for y: $1 - F_x(x) = 10(^{-y})$. Ordinate 4 on the scale is associated with the mention "<0.0001" to take account of the truncation that has been performed. A horizontal line marks the selected control limit. FIG. 5 shows a conventional $T^2$ control chart and the corresponding $P_u$ chart.

An observation value x associated with the index i of a distribution function $F_x$ is marked on a bilateral chart $P_b$. The observation is then marked on the chart at abscissa i and ordinate y as defined by:

if $x \leq m$   $y = \min(-\log_{10}((1-F_x(x))*2), 4)$ if $x > m$   $y = \min(-\log_{10}(F_x(x))*2), 4)$ where m designates the mean of the distribution: $F_x(m) = 0.5$.

Figure 6A:
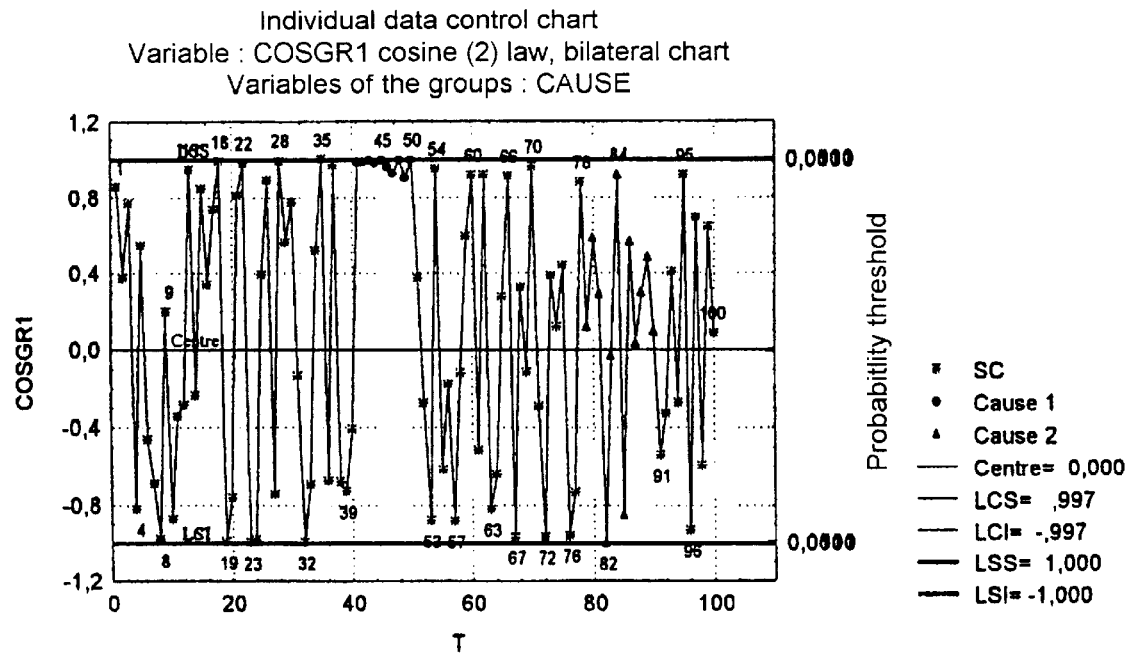
FIG. 6 graphically depicts a cosine control chart with a corresponding $P_b$ chart.
Figure 6B:
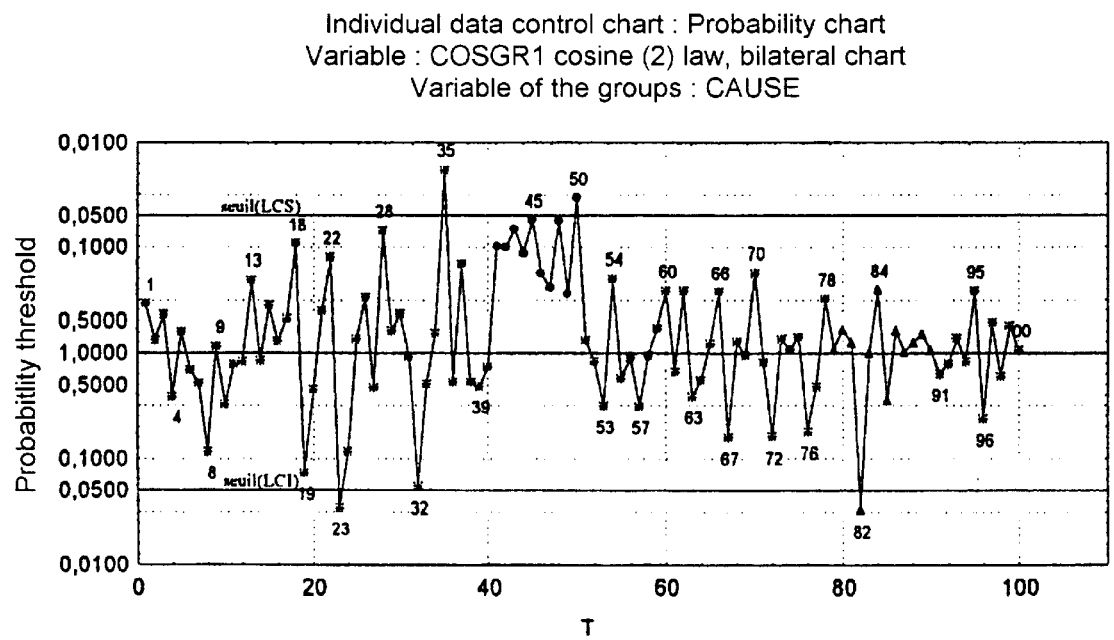

The ordinate scale is graduated in threshold values associated with integer values of y: $10^{(-|y|)}$. A horizontal line marks the control limit associated with the selected control threshold. FIG. 6 shows a conventional cosine control chart and the corresponding $P_b$ chart.

A5—Interpretation of Special Causes

The above-defined control charts give the people in charge of the process additional information enabling them to discover all of the points in the history which do not correspond to proper operation of the process, and for each of them to identify the real cause of the anomaly. The tools described above thus enable each identified cause of an anomaly to be associated with a direction in the observation space and with two indicators enabling it to be identified.

The second stage of the method of the invention is that of control proper, and it comprises the following steps:
S1—the data is initially transformed;
S2—anomalies are detected and identified by monitoring using control charts; and
S3—where necessary, a combination of causes or a new special cause is identified and integrated into the method.

During this second stage, the system receives measurements and data coming from the process (coming from directly connected sensors or input manually), which measurements are based on the model of the analyzed historical measurements. It then enables warnings to be triggered when the process drifts. It then specifies the probable cause(s) of the drift, where causes are selected amongst those that have already been identified during the learning stage.

Each observation which is received from the process is processed in several steps:

S1—Prior Transformation of the Data

The data is subjected to the transformations as defined in step A1.

S2—Detecting and Identifying Anomalies

The value of $T^2$ associated with the observation using the calculation model defined in step A2 is calculated and marked relative to the control limit of the $T^2$ chart.

If the chart finds that the observation is under control, then the processing of the observation terminates, otherwise the observation is representative of the process not operating properly.

Under such circumstances, the values taken by the indicators associated with the various causes identified during the learning stage are calculated and the position of the point representing the new observation is examined on $P_b$ type control charts associated with said indicators. When both indicators associated with the same cause indicate that the observation is out of control, then this cause is taken as possibly being at the origin of actual misfunction of the process; the system sends a warning to the process controller concerning the misfunction together with its diagnosis as to the origin of the misfunction.

Processing of the observation then terminates, unless the system has also identified and recognized another one of the listed causes. Under such circumstances, the following additional step is necessary.

S3—Where Necessary, a Combination of Causes or a New Special Cause is Identified and Integrated in the System When no cause is recognized in the preceding step, then tests are made to see whether the observed anomaly stems from the simultaneous appearance of two known causes.

For this purpose, linear regression is performed without a constant term, of the "step by step" type or of the "best subset" type, taking the observation point centered on the center of the under-control distribution as the variable to be explained and the cause variables as the explanatory variables.

If a large multiple correlation coefficient R is obtained while using only two explanatory variables, and in particular if R>0.95, then it can be considered that there is a simultaneous occurrence of the two causes associated with these two variables. It is possible in like manner to consider the possibility of more than two causes occurring simultaneously, in particular three causes or four causes.

When no cause or combination of causes in the list is recognized, then it is necessary to perform manual identification based on the knowledge and experience of the people in charge of the process.

What is claimed is:

1. A statistical method of controlling an industrial process on the basis of readings of indicators or measurement of magnitudes characteristic of inputs, outputs, and control and operating parameters of said process, and capable of being represented by observation points in frames of reference associating their values to their sampling indices, said indicators or measurements being given by sensors or by manual input, in which:

a) the observed values are transformed so that the resulting values are compatible with the multidimensional Gaussian distribution model, and constitute data corresponding to the observation points used in the remainder of the method;

b) said observation points are situated in a multidimensional space, in which each dimension is associated with a measured magnitude;

c) amongst the observation points, points that are said to be "under control" and that correspond to proper operation of the process are distinguished from points which are said to be "out of control";

d) the distribution center of the points under control is calculated as being the center of gravity of the observation points under control;

e) out of control observation points that are concentrated in some particular direction from the distribution center of the points under control are identified;

f) this direction is associated with a common cause for drift of said process;

g) each observation point and anomaly direction pair is associated with indicators in order to propose zero, one, or more causes of anomaly that are liable to be associated with the observation that has been made; and h) when an anomaly is analyzed in this way, a warning is triggered and the drift detected in this way in the industrial process is remedied.

2. A statistical process control method according to claim 1, in which each observation and anomaly pair is associated with an indicator giving the intensity of the relationship between the observation and the anomaly, referred to as the "cause variable", the indicator being obtained as the component of the observation point along the direction associated with the cause, said indicator being calculated as a scalar product of the observation vector multiplied by the direction vector for the direction of the cause, the scalar product matrix used as an indicator of the intensity of the relationship between an observation and an anomaly being the matrix $V^{-1}$ where $V^{-1}$ designates the matrix which is either the inverse of the covariance matrix V of the data under control when V is of full rank, or else the psuedo-inverse of V if V is not of full rank.

3. A statistical process control method according to claim 2, in which a proximity indicator is used between the observation and an anomaly, referred to as an "angular proximity indicator", obtained by measuring the angle between a vector representing the observation and a vector representing the direction associate with the anomaly, the angular proximity indicator being the cosine of said angle, said cosine being calculated by dividing the intensity indicator by the norm of the vector representing the observation, which norm is defined by said matrix $V^{-1}$.

4. A statistical process control method according to claim 3, in which a function F is used to define the control limit $L\alpha$ of the angular proximity indicator beyond which an observation is allocated to said anomaly, said function F representing a distribution function of the cosine of the angle (x) between an arbitrary given direction of $R^n$, where $n \geq 2$, and a centered Gaussian random vector $R^n$ having the intensity matrix as its covariance matrix, said distribution function F of said random variable being given by the following formula:

$$\begin{aligned}&\text{if } x < -1 \quad & F(x) = 0 \\ &\text{if } x > 1 \quad & F(x) = 1 \\ &\text{if } x \geq -1 \text{ and } 1 \quad & F(x) = 1 - \frac{S(\text{ArcCos}(x))}{S(\pi)}\end{aligned}$$

where $S(\theta) = \int_0^\theta \sin^{n-2}(t)\,dt$ such that $L\alpha = F^{-1}(\alpha)$, where $\alpha$ represents the acceptable probability for a false alarm, $\alpha$ preferably representing a value lying in the range 0.001% to 0.05%.

5. A statistical process control method according to claim 1, organized as:
 a learning stage which analyzes a history of the process to contribute to identifying anomalies by performing the following steps:
  A1; prior transformation of the data;
  A2; separating measurements under control from measurements out of control;
  A3; identifying the types of special causes and the associated direction parameters by a method of automatically classifying observations that is adapted to identify observations that are likely to be associated with the same anomaly, and that enables observation points situated close to the same straight line coming from the distribution center of the observations under control to be grouped together;
  A4; creating and examining control charts on the special cause indicators; and
  A5; interpreting the special causes;
 a control stage proper which, for each new observation of the process variables, diagnoses whether the observation depends on an anomaly, and if so which anomaly(ies) is/are probable, said stage comprising the following three steps:
  S1; prior to transformation of the data;
  S2; detecting and identifying anomalies by inspecting control charts; and
  S3; where necessary identifying a combination of causes or a new special cause and integrating that in the method.

6. A statistical process control method according to claim 3, in which the automatic classification method used is of the hierarchical ascending classification type accepting the absolute value of the cosine as a similarity index between two observation vectors and accepting the maximum binding criterion also known as the diameter criterion for directing the making up of groups.

7. A statistical process control method according to claim 5, in which the direction used in step A3 of the learning stage to represent an anomaly is the first inertial axis of the observation points associated with said anomaly, which axis passes through the distribution center of the under-control observations, said axis being determined by non-centered and non-reduced principal component analysis on the cloud of observation points associated with the anomaly, points previously centered on the distribution center of the under-control observation points.

8. A statistical process control method according to claim 5, in which control charts are used having probability thresholds with a logarithmic scale, the unilateral chart $P_u$ being used when control relates to a single limit (as in the $T^2$ chart), the bilateral chart $P_b$ being used when control relates to a lower limit and an upper limit, said charts providing easier interpretation and greater uniformity of presentation for charts associated with various probability distributions.

* * * * *